US008886616B2

(12) United States Patent
Stoakes et al.

(10) Patent No.: US 8,886,616 B2
(45) Date of Patent: Nov. 11, 2014

(54) BLOCKLET PATTERN IDENTIFICATION

(76) Inventors: Timothy Stoakes, Humburg Scrub (AU); Andrew Leppard, Unley (AU)

( * ) Notice: Subject to any disclaimer, the term of this patent is extended or adjusted under 35 U.S.C. 154(b) by 0 days.

(21) Appl. No.: 13/348,209

(22) Filed: Jan. 11, 2012

(65) Prior Publication Data

US 2013/0179408 A1     Jul. 11, 2013

(51) Int. Cl.
*G06F 17/30* (2006.01)
(52) U.S. Cl.
USPC .......................................... 707/693; 707/812
(58) Field of Classification Search
CPC ............................. G06F 17/30067; H03M 7/30
USPC ......... 707/664, 692, 693, 695, 697, 699, 700, 707/701, 736, 747, 812, 830, 696, 698
See application file for complete search history.

(56) References Cited

U.S. PATENT DOCUMENTS

| 8,315,984 B2 * | 11/2012 | Frandzel | 707/661 |
| 8,595,198 B1 * | 11/2013 | Chamness | 707/693 |
| 2009/0313248 A1 * | 12/2009 | Balachandran et al. | 707/6 |
| 2011/0016152 A1 * | 1/2011 | Popovski et al. | 707/797 |
| 2011/0055174 A1 * | 3/2011 | Popovski et al. | 707/693 |
| 2012/0204024 A1 * | 8/2012 | Augenstein et al. | 713/150 |
| 2013/0191349 A1 * | 7/2013 | Akirav et al. | 707/692 |

* cited by examiner

*Primary Examiner* — Greta Robinson

(57) ABSTRACT

Apparatus, methods, and other embodiments associated with blocklet pattern identification are described. One example method includes accessing a blocklet produced by a computerized data de-duplication parsing process before providing the blocklet to a duplicate blocklet determiner. The example method also includes hashing a portion of the blocklet to produce a pattern indicating hash and then identifying the blocklet as a pattern blocklet if the pattern indicating hash matches a pre-determined pattern indicating hash. To improve efficiency in a data de-duplication process, the blocklet pattern identifying may be performed independently from a data structure and process used by the duplicate blocklet determiner. If the blocklet is a pattern blocklet, then the method includes selectively controlling the duplicate blocklet determiner to not process the pattern blocklet. The duplicate determination is not needed because a pattern determination has already been made.

6 Claims, 6 Drawing Sheets

BLOCKLET PATTERN IDENTIFICATION

BACKGROUND

Data de-duplication systems continue to practice new methods for identifying duplicate blocklets of data. These methods share the property that either incoming blocklets or information about incoming blocklets is compared to stored blocklets or information about stored blocklets to determine whether an incoming blocklet is unique or is a duplicate. While impressive gains have been made in duplicate determinations, which have led to improved efficiency in data reduction, additional improvements may be desired.

Simple patterns may appear in data. For example, a document may be padded with a run of space characters while a data stream may include a long run of all-zero bytes. Simple patterns may include contiguous runs of repeating single characters (e.g., AAAAAA . . . A), may include contiguous runs of repeating pairs of characters (e.g., ABABAB . . . AB), or may include contiguous runs of even larger repeating groups of characters (e.g., ABCDABCDABCD . . . ABCD). While characters are described, more generally the repeating item may be a value (e.g., bit, byte). In photographs there may be long runs of repeating codes associated with a color (e.g., sky blue) that appears frequently in a photograph. Depending on the type of data, different patterns may be common. For example, sparse files may be padded with all zero patterns.

Data compression and data de-duplication are both concerned with reducing the space required to store data. One well known data compression algorithm detects long runs of characters using a byte-wise scan and then replaces the long runs of characters with, for example, an identifier and a count. This is known as run-length encoding. Unfortunately, performing byte-wise scans can be computationally expensive.

Conventional data de-duplication approaches may parse a larger block of data into smaller blocklets of data and then produce hopefully unique fingerprints for the blocklets. The fingerprints are only "hopefully" unique because when the fingerprint is produced using a hash function there may be a possibility of a hash collision. In some conventional systems, parsing the larger block into smaller blocklets may include finding blocklet boundaries using a rolling hash. In some examples, the presence of a repeating pattern (e.g., long run of zeroes) makes it less likely that the rolling hash will indicate a boundary and more likely that a maximum blocklet size will be reached. A maximum blocklet size is typically imposed to prevent pathological behavior in a data de-duplication system. Reaching a maximum blocklet size may force a blocklet boundary to be placed even though the rolling hash did not indicate a desired blocklet boundary. The presence of repeating patterns in the block may lead to low data entropy. The lower the entropy of the data, the less likely that a conventional rolling hash will find a boundary in the data and the more likely that a maximum sized blocklet will be produced. "Entropy", as used herein, refers to a measure of uncertainty associated with the randomness of data in an object. The entropy of data that is truly random is one. The entropy of a long string of duplicate characters is nearly zero. The entropy of most data falls between these two limiting examples.

Fingerprinting a blocklet may include performing a blocklet-wide hash. One blocklet-wide hash that has been used is an MD5 (Message Digest Algorithm 5) hash. Parsing a block into blocklets and then fingerprinting the blocklets using, for example, the MD5 hash, facilitates storing unique blocklets and not storing duplicate blocklets. Instead of storing duplicate blocklets, smaller representations of stored blocklets can be stored in file representations, object representations, and other data representations. Conventional de-duplication systems already achieve significant reductions in the storage footprint of data, including pattern data, by storing just the unique blocklets and storing the smaller representations of duplicate blocklets. To consume an even smaller data footprint, conventional de-duplication approaches may compress blocklets after they have been parsed out of the larger block. However, the compression may once again include a computationally expensive byte-wise scan that looks for opportunities to perform run-length encoding.

Identifying a contiguous run of repeating characters provides an opportunity to perform compression using, for example, run length encoding. Identifying a run of repeating characters may also provide other opportunities, for example, for determining the starting or ending location of a sparse region of a file. However, as described above, conventional systems tend to find these contiguous runs of repeating characters either by performing a computationally expensive byte-wise scan or by comparing a received blocklet to a stored blocklet. Greater efficiencies are desired.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
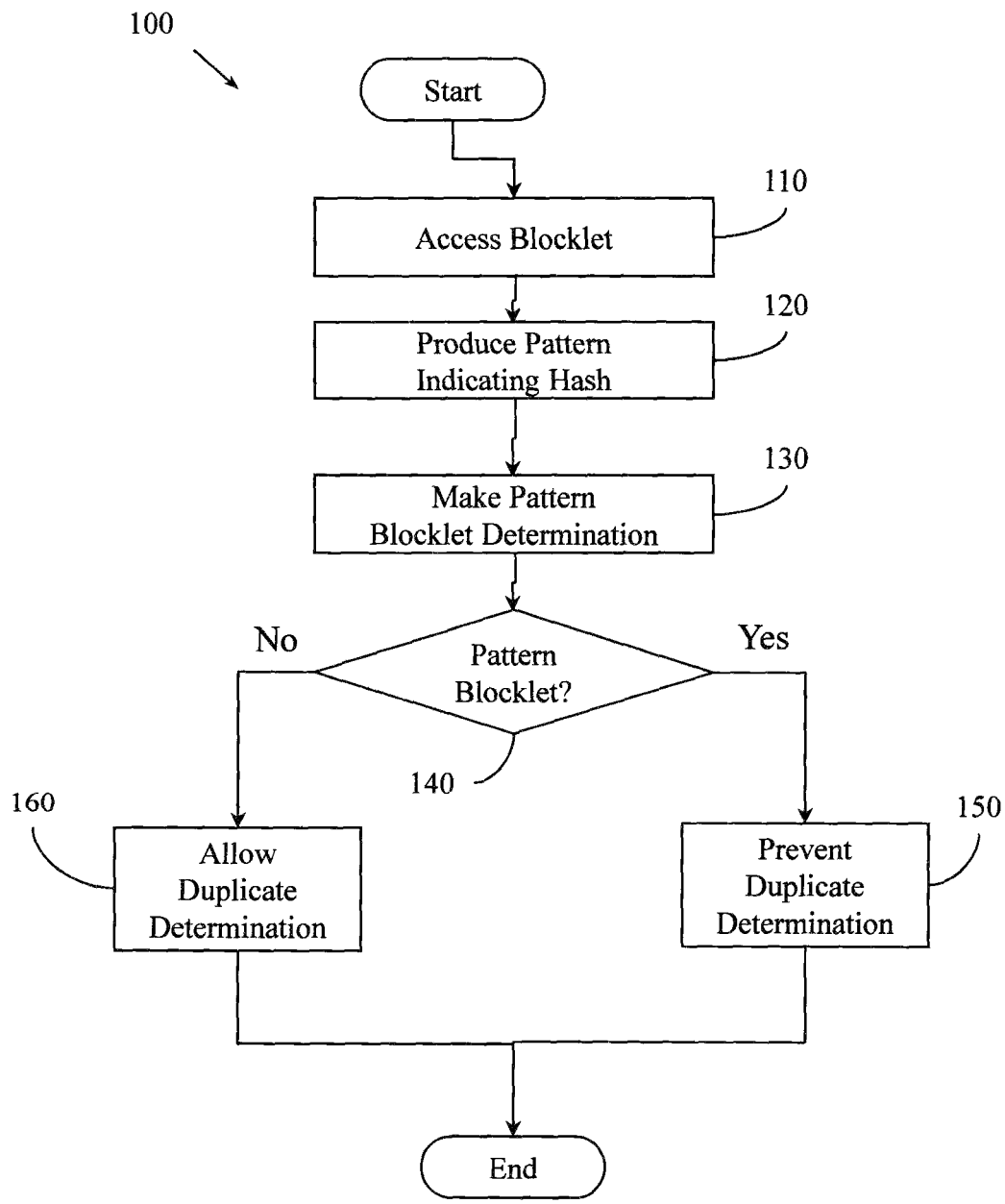
FIG. 1 illustrates an example method associated with blocklet pattern identification.

Example systems and methods identify whether a blocklet is a pattern blocklet. The blocklet will have been parsed out of a larger block of data by a de-duplication system. The identification as a pattern blocklet may be made without doing a bit-wise, byte-wise, or other comprehensive scan and without using data structures or processes involved in making a duplicate blocklet determination by the de-duplication system. In one example, fingerprints of blocklets that contain certain repeating patterns are pre-established and stored in convenient locations (e.g., memory, cache, registers) before de-duplication begins. For example, a record of the MD5 hashes of maximum length blocklets that hold only single characters, bits, bytes, or values may be stored. In this example, if a standard 8-bit value is used, then the MD5 hash of a maximum length blocklet that holds only instances of the single 8-bit value can be stored in a data structure with 256 entries. One skilled in the art will appreciate that more or less than 256 entries could be used to look for more or less pre-defined blocklet patterns.

In one example, a "pattern blocklet" is a blocklet whose entire contents are a contiguous run of a single repeating value (e.g., bit, byte, character). In another example, a "pattern blocklet" is a blocklet whose entire contents are a contiguous run of two or more repeating values (e.g., bit, byte, characters). In one example, a "pattern blocklet" may have less than all of its contents as a contiguous run of a repeating value or a group of repeating values.

In one example, the fingerprints of pattern blocklets are included as part of the de-duplication hardware or software distribution. In this example, information about a blocklet parsed out of a larger block does not have to be compared to information about other blocklets known to the de-duplication system to identify a pattern blocklet. Information about a blocklet parsed out of a larger block can be compared to information stored in the pre-loaded data structure. The pre-loaded data structure can be designed to fit entirely into a fast memory (e.g., registers, cache) to make the pattern blocklet determination much faster than a duplicate determination that may require accessing information on disk or other slower memory.

In a data de-duplication system that uses a rolling hash based process to identify boundaries for parsing a data stream into blocklets, a boundary may be identified when values used to produce the rolling hash value satisfy a pre-determined constraint. The rolling hash value and the pre-determined constraint may be carefully crafted to produce a desired mean blocklet length. However, when a data stream has low entropy the rolling hash may never satisfy the pre-determined constraint. To prevent pathological behavior (e.g., unacceptably long blocklets) a blocklet having a maximum blocklet length may be declared without finding a boundary using the rolling hash. By way of illustration, data that has a single value (e.g., all zeroes) has very low entropy and thus is unlikely to satisfy the pre-determined constraint. Similarly, data that has repeating patterns of more than one value (e.g., ABCABC...ABC) also has low entropy and is unlikely to satisfy the pre-determined constraint. Thus, in one example, an entropy indication related to the rolling hashes produced while looking for blocklet boundaries may be used to trigger and/or control additional blocklet pattern matching processing.

In one example, when a blocklet boundary is artificially forced because no boundary has been found by the rolling hash and the maximum blocklet size has been reached, additional processing may be undertaken to determine whether the blocklet having the maximum blocklet size contains a pattern. The additional processing may include, for example, comparing the fingerprint hash for the blocklet to a stored set of fingerprint hashes known to be associated with patterns. The comparison may occur without accessing the data structures and processes that use the fingerprint hash to determine whether a blocklet is a duplicate blocklet. In another example, one or more hashes different from the hash used to fingerprint the blocklet may be compared to a stored set of known hashes. Once again the comparison may be made without accessing the data structures and processes used to make a duplicate determination. These one or more different hashes may be designed to be resistant to hash collisions while producing a quick answer concerning whether a blocklet is a pattern blocklet.

In one example, determining whether the blocklet is a pattern blocklet can proceed in parallel with other processing. For example, an MD5 hash that could be used in a duplicate determination may be computed at the same time as the pattern blocklet determination is being made. If the blocklet turns out to be a pattern blocklet, then the MD5 hash may simply be ignored. If the blocklet turns out not to be a pattern blocklet, then the MD5 hash may be provided to a duplicate determiner.

In another example, a count of the number of discrete values produced by the rolling hash can be maintained. If the rolling hash only ever produces one discrete value, then the blocklet may only contain a contiguous run of single repeating characters. In another example, a sequence of rolling hash invocations might produce a known sequence of values that indicate a pattern. For example, a sequence like (n, n+1, n+2, . . . ) may indicate a pattern. The rolling hash may be prone to hash collisions and thus additional processing may be undertaken to determine whether the blocklet is actually a blocklet pattern. The additional processing may, once again, include hashing the blocklet using the fingerprint hash or one or more different hashes that are designed to efficiently identify pattern blocklets without accessing the duplicate determination framework and without requiring a byte-wise comparison.

The number of discrete values produced by the rolling hash while looking for a boundary varies directly with the entropy of the data stream. Lower entropy data may produce fewer different rolling hash values while higher entropy data may produce more different rolling hash values. Thus, in this example, when a maximum length blocklet is produced, the number of discrete values produced by the rolling hash can be used to control whether additional pattern discovery processing will be performed. When the rolling hash entropy calculation is employed, patterns may be suspected in blocklets that are not of the maximum blocklet length. For example, a boundary may be found using a conventional approach but the number of discrete rolling hash entropy values encountered may indicate that the blocklet has low entropy. In this case a contiguous run of repeating values that are susceptible to being compressed may be present even though a blocklet boundary was discovered through a normal approach and a maximum sized blocklet was not declared. Fingerprint hashes may not be suitable for identifying a pattern in this case because a blocklet of a first size that includes only copies of a single value may produce a first fingerprint hash while a blocklet of a second size that includes only copies of the same single value may produce a second different fingerprint hash. Thus, additional blocklet pattern specific hashes may be suitable for recognizing patterns without performing byte by byte comparisons and without accessing the duplicate determination framework.

In one example, a combination of approaches can be performed. For example, if the number of discrete values produced by the rolling hash is below a threshold, then a stored set of rolling hash values may be examined to determine whether the value(s) for the rolling hash are known to be value(s) that are produced by a certain pattern (e.g., all zeroes, all ones). In another embodiment, rather than basing the decision on the number of discrete values produced, control can be exercised based on whether an entropy value falls within a certain range. Since the rolling hash value will have already been produced, this approach may eliminate the time and computing effort required to produce the fingerprint hash. If the rolling hash value(s) are not known to be values that are produced by a certain pattern, then the fingerprint hash or other pattern specific hashes may be computed and compared to stored known fingerprint hash values associated with patterns and with other pattern specific hash value associated with patterns. In one example, the fingerprint hash or other pattern specific hashes may also be computed and then either referenced or ignored based on the result of pattern blocklet determination. The comparing may occur before going through the conventional duplicate blocklet determination and can prevent having to do the conventional duplicate blocklet determination.

In one example, the rolling hash can be designed so that runs of repeating values produce a run of repeating hash values. In this example, locations where a contiguous run of repeating hash values begins, ends, or changes may be tracked until a threshold number of changes are encountered. This facilitates achieving pattern matching based data reduction even when the repeating pattern may not reach an entire blocklet length.

In one example, when a blocklet that contains a pattern leads to a maximum sized blocklet being declared, then a data structure (e.g., hash table) of the fingerprint hashes associated with interesting pattern chunks of the maximum sized blocklet can be accessed before using the conventional duplicate blocklet determination processes and data structures. In one example, a conventional fingerprint hash (e.g., MD5) could be employed. In another example, one or more extra hashes may be computed in addition to the conventional fingerprint hash. The one or more extra hashes could have different properties (e.g., different collision resistance, different computation times, different pattern matching ability) that are useful for accessing pattern matching data structures without accessing conventional duplicate chunk determination structures and processes. These one or more extra hashes could also be compared to values in the data structure(s) where hashes are stored. To improve efficiency, the additional data structure may be stored in a very efficient memory (e.g., registers, cache, RAM) that would not experience a disk access.

In one example, identifying that a pattern is present in a stream includes parsing the ingest stream with a suitable parser, hashing the resulting blocklet, and then looking up the hash in an indexing structure. If a match is found in the indexing structure then the blocklet is a pattern blocklet of a known type. If a match is not found, then the blocklet is not a pattern blocklet of a known type. In one example, the blocklet may only be examined to determine whether it has a repeating pattern if the blocklet is a maximum length blocklet. Determining whether the blocklet has a repeating pattern is useful even if the entire blocklet does not ultimately end up being treated as a pattern blocklet.

For example, even if a blocklet is not initially identified as being a pattern blocklet, the blocklet may be subjected to additional processing before proceeding to a duplicate determination. For example, the blocklet may be reparsed using a smaller maximum blocklet length in an attempt to find smaller pattern blocklets that may appear in the larger non-pattern blocklet.

While repeating single value (e.g., bit, byte, character) patterns have been described, repeating multi-value patterns can be discovered and matched using similar approaches. For example, a larger lookup structure and different hashing approaches may be employed to account for multi-value patterns. Additionally, different hashes may be used to account for misalignment of multi-value pattern blocklets so that BABABAB . . . AB would be recognized as B plus ABABAB . . . AB. In one example, once a set of pattern blocklets has been matched, the pattern blocklets may be re-parsed. In another example, once a pattern blocklet has been detected, the next blocklet in the stream may also be processed to determine whether it is also a pattern blocklet. If multiple pattern blocklets are encountered in a row, then additional compression can be achieved.

The following includes definitions of selected terms employed herein. The definitions include various examples and/or forms of components that fall within the scope of a term and that may be used for implementation. The examples are not intended to be limiting. Both singular and plural forms of terms may be within the definitions.

ASIC: application specific integrated circuit.
CD: compact disk.
CD-R: CD recordable.
CD-RW: CD rewriteable.
DVD: digital versatile disk and/or digital video disk.
I/O: input/output
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
USB: universal serial bus.
WAN: wide area network.
PPP: Point-to-Point protocol References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with blocklet pattern identification. Method 100 may include, at 110, accessing a blocklet produced by a computerized data de-duplication parsing process. In one example, the blocklet is accessed before the blocklet is provided to a duplicate blocklet determiner.

Accessing the blocklet at 110 may include, for example, receiving the data that comprises the blocklet, accessing the data that comprises the blocklet, receiving a pointer to the data that comprises the blocklet, accessing a pointer to the data that comprises the blocklet, receiving a signal that a known location (e.g., buffer) that stores a blocklet to be analyzed is ready for analysis, and other actions. The blocklet may have been produced, for example, by a data de-duplication parser. The data de-duplication parser may have identified blocklet boundaries using a rolling hash process. In one example, the data de-duplication parser and the rolling hash process may be constrained to produce a blocklet no longer than a maximum size.

Method 100 may also include, at 120, hashing a portion of the blocklet to produce a pattern indicating hash. In one example, the portion may be all of the blocklet while in another example the portion may be less than all of the blocklet. For example, a first hash may be taken to facilitate determining whether the entire blocklet is a pattern blocklet and two second hashes may be taken to facilitate determining whether the first and second halves of the blocklet are pattern blocklets.

The blocklet, or portions of the blocklet, may be hashed at 120 using a pattern hash function that produces a pattern hash value. In one example, the pattern hash function may be the same as a fingerprint function used by a duplicate block determiner. The duplicate block determiner may be part of an ingest process performed by a data de-duplication process and/or apparatus. In a different example, the blocklet may be hashed at 120 using a pattern hash function that is different from a fingerprint hash function used by the duplicate determiner. In one example, the pattern hash function is configured to produce a pattern hash value that has a zero probability of a hash collision in a pattern hash value space. While a single pattern hash function is described, one skilled in the art will appreciate that multiple pattern hash functions could act on the blocklet in parallel, substantially in parallel, in sequence, or in other orders. In this way, a determination concerning whether the blocklet is a blocklet pattern can be made more quickly than using the duplicate determination approach used by conventional systems. Additionally, while the hashing is proceeding, a hash (e.g., MD5) that may be useful for duplicate determination may be computed. If the blocklet is a pattern blocklet, then this hash may be ignored. But if the pattern is not a pattern blocklet, and if a duplicate determination will be made, this hash may already be available for the duplicate determiner.

Method 100 may also include, at 130, identifying the blocklet as a pattern blocklet. In one example, the blocklet will be identified as a pattern blocklet when the pattern indicating hash matches a pre-determined pattern indicating hash. To improve efficiency, the identification of the blocklet as a pattern blocklet may be performed independently from a data structure(s) and process(es) used by the duplicate blocklet determiner. In one example, the pre-determined pattern indicating hash may be stored in a memory that will not experience a disk i/o or tape i/o. By way of illustration, the pre-determined hash values may be stored in registers in an apparatus performing the data de-duplication method, in cache memory in an apparatus performing the data de-duplication method, or in other locations that may not experience a disk i/o. Thus, identifying the blocklet as a pattern blocklet may include comparing the pattern indicating hash to one or more pre-determined hash values stored separately from a data structure used by the duplicate determiner.

Method 100 may also include, at 140, making a decision to control whether a duplicate determination will be made for the blocklet. If the decision at 140 is that the blocklet is a pattern blocklet, then method 100 will proceed at 150 to prevent a duplicate determination to be made for the blocklet by selectively controlling the duplicate blocklet determiner to not process the pattern blocklet. If the decision at 140 is that the blocklet is not a pattern blocklet, then method 100 will proceed at 160 to allow a duplicate determination to be made for the blocklet. Recall that in different examples a pattern blocklet may comprise a contiguous run of a single repeating value, a contiguous run of two or more repeating values, and other patterns.

In one example, method 100 may also include providing an indication of a transition between a region in a blocklet that may contain a pattern and a region in the blocklet that may not contain a pattern.

In one example, when method 100 proceeds at 160 to allow a duplicate determination to be made, method 100 may provide additional information to the duplicate determiner. For example, method 100 may provide an indication of how close the blocklet came to being determined to be a pattern blocklet. This indication may be related to the blocklet entropy and thus method 100 may provide the blocklet entropy. The duplicate determiner may then act differently based on the nearness of the pattern determination and/or the entropy. For example, method 100 may control the duplicate determiner to only look in memory-resident data structures when making a duplicate determination for a low entropy blocklet that was close to being defined as a pattern blocklet. Since the low entropy non-pattern blocklet may compress very well, it may make more sense to treat the block as a unique block and compress it rather than doing a complete duplicate determination.

While FIG. 1 illustrates various actions occurring in serial, it is to be appreciated that various actions illustrated in FIG. 1 could occur substantially in parallel. By way of illustration, a first process could access blocklets, a second process could produce pattern indicating hashes, and a third process could make pattern blocklet identifications. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a non-transitory computer-readable medium may store computer executable instructions that if executed by a machine (e.g., processor) cause the machine to perform method 100. While executable instructions associated with method 100 are described as being stored on a computer-readable medium, it is to be appreciated that executable instructions associated with other example methods described herein may also be stored on a computer-readable medium.

Figure 2:
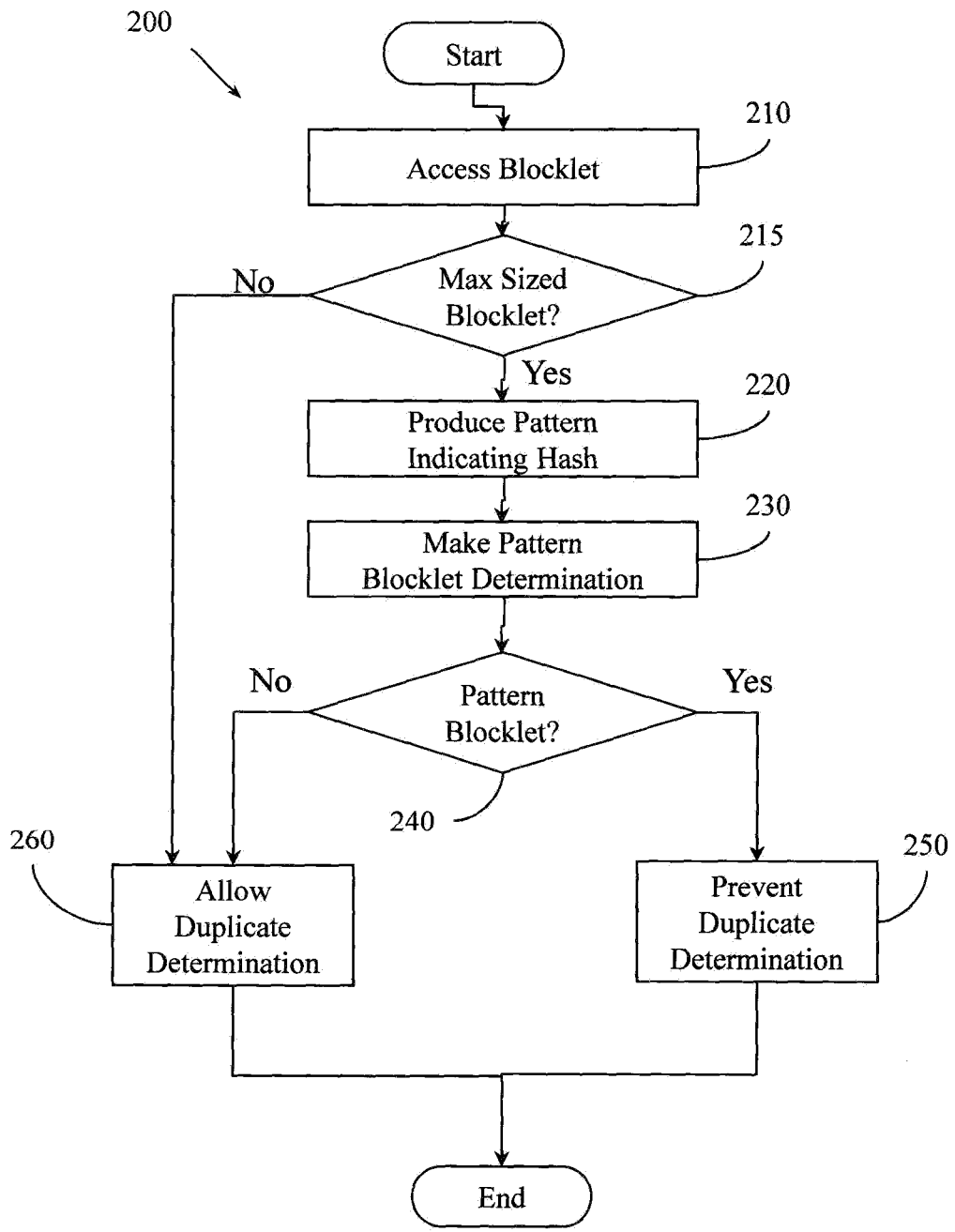
FIG. 2 illustrates an example method associated with blocklet pattern identification.

FIG. 2 illustrates a method 200 associated with blocklet pattern identification. Method 200 includes several actions similar to those described in connection with method 100 (FIG. 1). For example, method 200 includes accessing a blocklet at 210, producing a pattern indicating hash at 220, making a pattern blocklet determination at 230, controlling process flow at 240, preventing a duplication determination at 250, and allowing a duplicate determination at 260. However, method 200 may include additional and different actions.

For example, method 200 includes, at 215, making a determination concerning whether the blocklet accessed at 210 is a maximum sized blocklet. When a data de-duplication parser cannot find an actual boundary in a block of data, the parser may artificially place a boundary when the maximum desired blocklet size is reached. When a maximum sized blocklet has been produced it may be more likely that the blocklet is a pattern blocklet. Therefore method 200 will only selectively perform the hashing at 220 and identifying at 230 upon determining that the size of the blocklet is the maximum size that can be produced by the data de-duplication method. Thus, if the decision at 215 is that the blocklet is a maximum sized blocklet, then method 200 will proceed to 220. If the decision at 215 is that the blocklet is not a maximum sized blocklet, then method 200 will proceed to 260 where a duplicate determination will be commenced.

Figure 3:
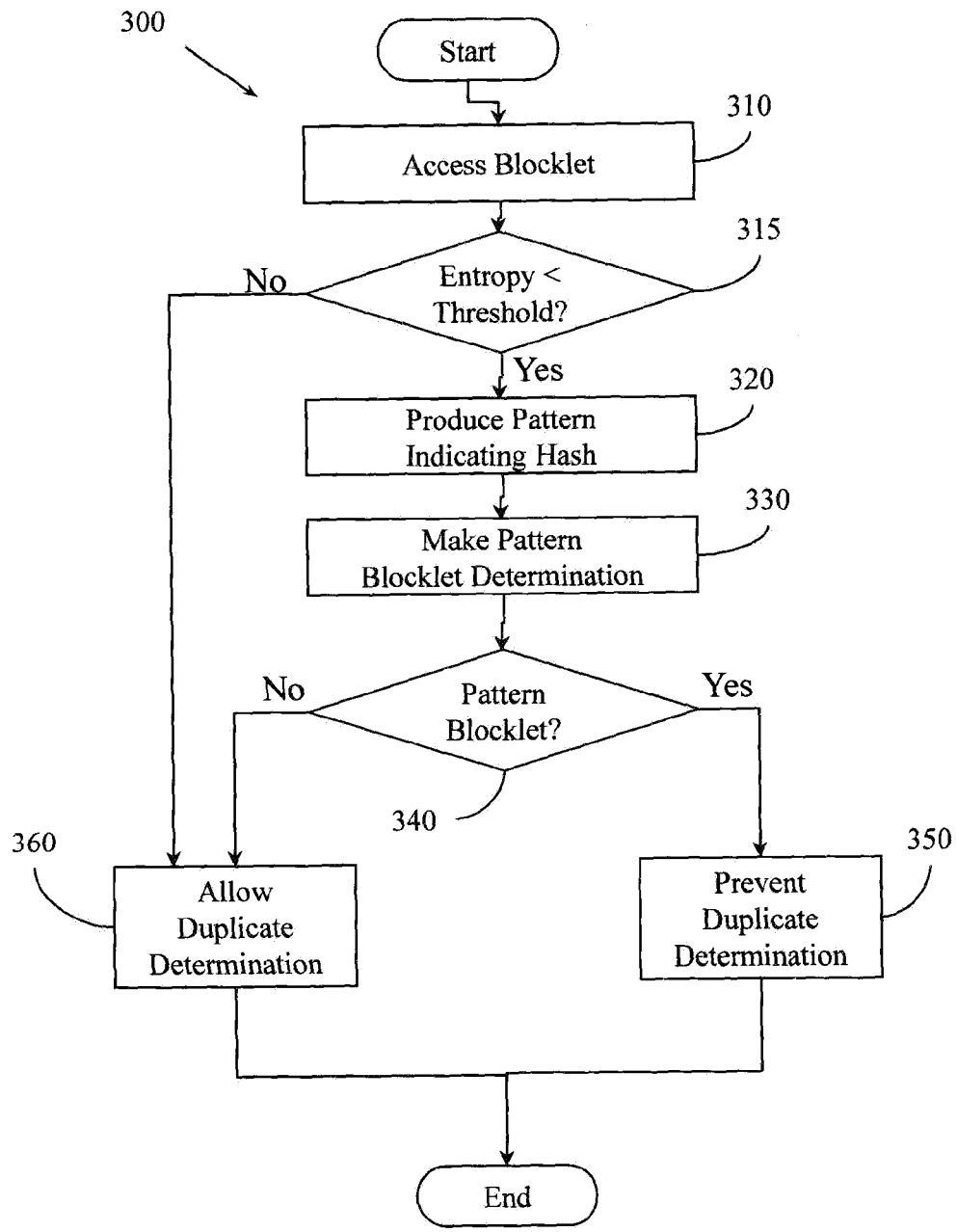
FIG. 3 illustrates an example method associated with blocklet pattern identification.

FIG. 3 illustrates a method 300 associated with blocklet pattern identification. Method 300 includes several actions similar to those described in connection with method 100 (FIG. 1). For example, method 300 includes accessing a blocklet at 310, producing a pattern indicating hash at 320, making a pattern blocklet determination at 330, controlling process flow at 340, preventing a duplication determination at 350, and allowing a duplicate determination at 360. However, method 300 may include additional and different actions.

For example, method 300 includes, at 315, making a determination concerning whether the entropy of the blocklet accessed at 310 is below a threshold or within a range. In one example, the entropy of the blocklet may have been determined as a function of values produced by a rolling hash process performed by a parser. When the entropy of a block is very low then it may be more likely that the blocklet is a pattern blocklet. Therefore method 300 will only selectively perform the hashing at 320 and identifying at 330 upon determining that the entropy of the blocklet is below a threshold level or within a range. Thus, if the decision at 315 is that the blocklet has an appropriate entropy, then method 300 will proceed to 320. If the decision at 315 is that the blocklet entropy is not below the threshold or within the range, then method 300 will proceed to 360 where a duplicate determination will be commenced. As described above, additional information may be provided to the duplicate determiner and that information may be used to control the duplicate determination. For example, a reduced search for duplicates may be performed if the entropy is within a certain range that indicates that the blocklet may compress well. The reduced search may be restricted to low-latency memory (e.g., RAM, cache) since it may be faster to compress the blocklet than to access high-latency memory (e.g., disk) to do a full duplicate determination.

While FIG. 2 illustrates decision 215 being made as a function of blocklet size and while FIG. 3 illustrates decision 315 being made as a function of blocklet entropy, in one example, a decision to proceed with producing a pattern indicating hash and pattern blocklet determination may be based on a combination of blocklet size and entropy. For example, a maximum sized blocklet with high entropy may not be checked for a pattern while a low entropy blocklet may be checked even though it is smaller than a maximum size.

Figure 4:
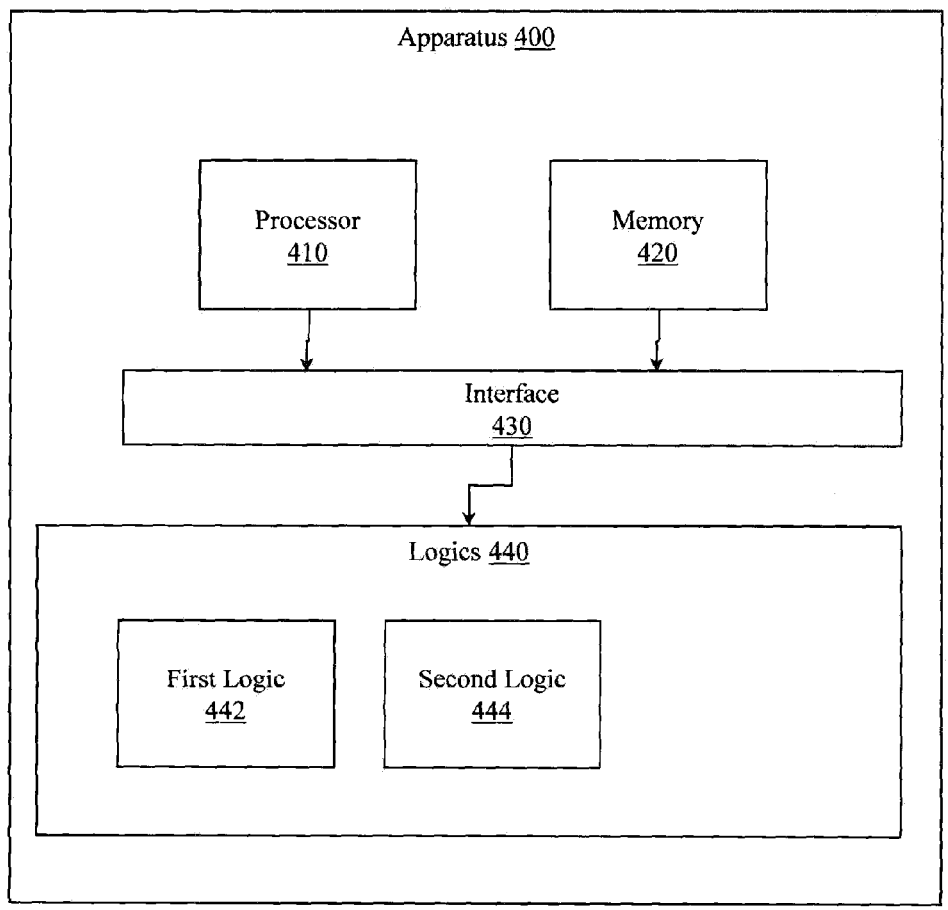
FIG. 4 illustrates an example apparatus associated with blocklet pattern identification.

FIG. 4 illustrates an apparatus 400 for performing pattern blocklet identification. Apparatus 400 includes a processor 410, a memory 420, a set 440 of logics, and an interface 430 to connect the processor 410, the memory 420, and the set 440 of logics. In one embodiment, apparatus 400 may be a special purpose computer that is created as a result of programming a general purpose computer. In another embodiment, apparatus 400 may include special purpose circuits that are added to a general purpose computer to produce a special purpose computer.

In one embodiment, the set 440 of logics includes a first logic 442 and a second logic 444. In one embodiment, the first logic 442 is configured to select a blocklet to be examined for the presence of a pattern capable of being compressed. In one example, the first logic 442 will proceed to select a blocklet to be examined for the presence of a pattern capable of being compressed only after determining that the blocklet is a maximum size blocklet produced by a data de-duplication parser.

In one embodiment, the second logic 444 is configured to determine whether the blocklet is a pattern blocklet. The second logic 444 may determine that the blocklet is a pattern blocklet using different approaches. In one example, the second logic 444 may be configured to determine whether the blocklet is a pattern blocklet using a fingerprint hash that may also be used as part of a duplicate blocklet determination. In another example, the second logic 444 may be configured to determine whether the blocklet is a pattern blocklet using a pattern hash different from a fingerprint hash that may be used as part of a duplicate blocklet determination. While a single hash is described, in different examples multiple hashes may be employed to make the pattern blocklet identification.

To improve efficiency, the memory 420 may be configured to store pre-determined hashes associated with patterns to be recognized by the second logic 444. Thus, the second logic 444 may be configured to determine whether the blocklet is a pattern blocklet by comparing a hash of the blocklet to a hash stored in memory 420. Comparing a hash of the blocklet to pre-determined hashes that are stored in memory 420 facilitates preventing disk i/o, which can be costly. In different examples, the pre-determined hashes may be configured to facilitate identifying a contiguous run of single repeating values (e.g., bits, bytes, characters), a contiguous run of two repeating values, contiguous runs of larger groups of repeating values, or other patterns.

Figure 5:
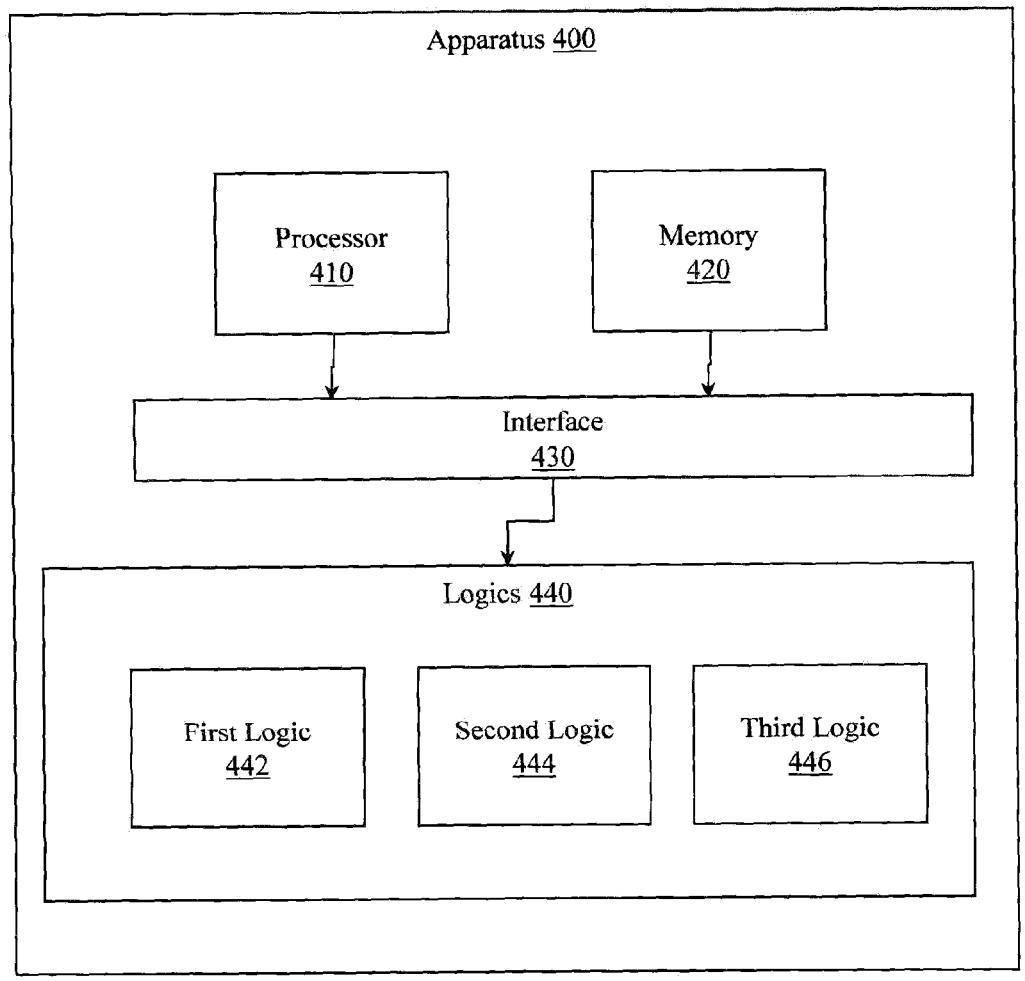
FIG. 5 illustrates an example apparatus associated with blocklet pattern identification.

FIG. 5 illustrates another embodiment of apparatus 400 associated with blocklet pattern identification. This embodiment includes a third logic 446. Third logic 446 is configured to determine the entropy of the blocklet. In this embodiment, the first logic 442 selects a blocklet to be examined for the presence of a pattern capable of being compressed after determining that the entropy of the blocklet is less than a pre-determined threshold. In this way, blocklets that are more likely to contain a pattern will be subjected to the additional pattern matching process.

In one example, first logic 442 may be configured to select a blocklet to be examined based on a combination of the blocklet size and the entropy. For example, even though a blocklet may not be a maximum sized blocklet, the first logic 442 may still select the blocklet for additional pattern matching processing if the entropy of the blocklet is below a threshold. In another example, even though a blocklet is a maximum sized blocklet, the entropy of the blocklet may indicate that it is very unlikely that the blocklet contains a pattern and thus this blocklet may not be selected for additional pattern matching processing.

The entropy of the blocklet may be used in other ways as well. In one embodiment the entropy of the blocklet may be used to control the amount of resources allocated to find a matching blocklet. By way of illustration, blocklets with higher entropy may be less likely to match, dedupe-wise, a blocklet in a subsequent ingest. Thus, less resources (e.g., time, computing cycles) may be allocated to search for a matching blocklet. By way of further illustration, blocklets with lower entropy may be more likely to match, dedupe-wise, a blocklet in a subsequent ingest. Thus, more resources (e.g., time, computing cycles) may be allocated to search for a matching blocklet.

In another embodiment, the entropy may be used to provide some guidance about which portion of a dedupe index is searched to look for matching blocklets. For example, given a blocklet with an entropy value E, the duplicate searching processes may be controlled to consider a certain portion(s) of the index as a function of the entropy value E.

Figure 6:
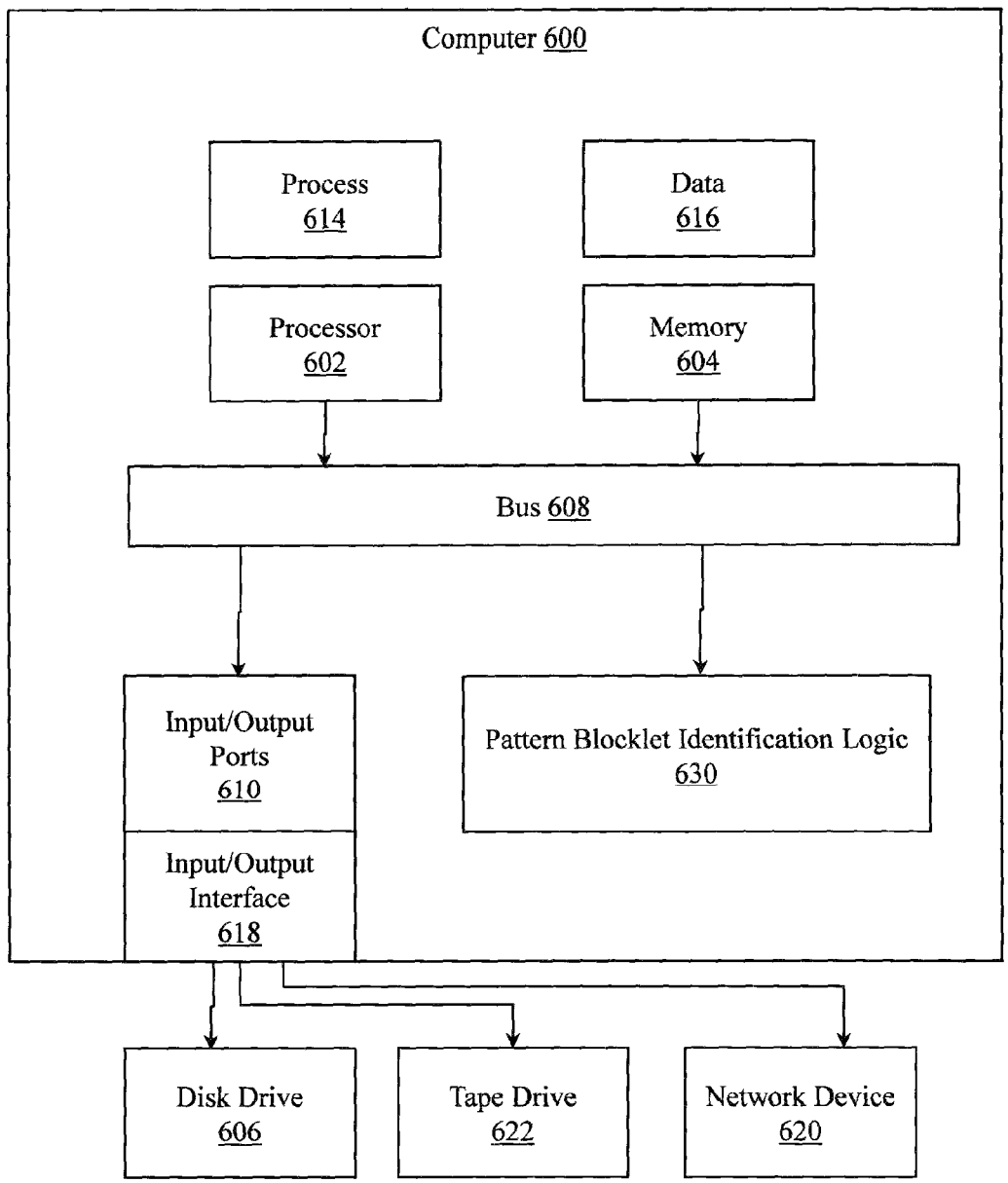
FIG. 6 illustrates an example computing environment in which example apparatus, systems, methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a pattern blocklet identification logic 630 configured to facilitate determining whether a blocklet is a pattern blocklet and to selectively control duplicate blocklet determinations based on the pattern blocklet determination. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for determining whether a blocklet that has been parsed from a block of data by a data de-duplication apparatus contains a pattern. Logic 630 may also provide means (e.g., hardware, software, firmware) for determining whether the blocklet is a duplicate of a blocklet known to the data de-duplication apparatus. Determining whether a blocklet is a duplicate blocklet may take significantly longer than determining whether a blocklet contains a pattern. Therefore logic 630 may also provide means for controlling processing so that the means for determining whether the blocklet contains a pattern acts first and thus potentially prevent the means for determining whether the blocklet is a duplicate from acting at all. The logic 630 may prevent the duplicate determination upon determining that the blocklet contains a pattern that can be compressed by a desired amount. The means associated with logic 630 may be implemented, for example, as an ASIC programmed to perform this special purpose programming. The means may also be implemented as computer executable instructions that are presented to computer 600 as data 616 that are temporarily stored in memory 604 and then executed by processor 602.

Generally describing an example configuration of the computer 600, the processor 602 may be a variety of different processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk drive 606 or tape drive 622 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM drive, a Blu-Ray drive, an HD-DVD drive, and so on. The memory 604 may store a process 614 and/or a data 616, for example. The disk 606 and/or the memory 604 may store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

What is claimed is:

1. An apparatus, comprising:
   a processor;
   a memory;
   a set of logics; and
   an interface to connect the processor, the memory, and the set of logics, the set of logics comprising:
      a first logic configured to select a blocklet to be examined for the presence of a pattern capable of being compressed, where the blocklet was produced by a data de-duplication parser;
      a second logic configured to determine whether the blocklet is a pattern blocklet, and
      a third logic configured to determine an entropy of the blocklet, and where the first logic selects the blocklet to be examined for the presence of a pattern capable of being compressed upon determining that the entropy of the blocklet falls within a pre-determined range.

2. The apparatus of claim 1, where the first logic selects the blocklet to be examined for the presence of a pattern capable of being compressed upon determining that the blocklet is a maximum size blocklet produced by the data de-duplication parser.

3. The apparatus of claim 1, where the second logic is configured to determine whether the blocklet is a pattern blocklet using a fingerprint hash associated with a duplicate blocklet determination.

4. The apparatus of claim 1, where the second logic is configured to determine whether the blocklet is a pattern blocklet using a pattern hash different from a fingerprint hash associated with a duplicate blocklet determination.

5. The apparatus of claim 1, where the memory is configured to store one or more pre-determined hashes associated with patterns to be recognized, where the one or more pre-determined hashes are configured to identify a contiguous run of single repeating values or a contiguous run of two or more repeating values, and where the second logic is configured to determine whether the blocklet is a pattern blocklet by comparing a hash of the blocklet to a hash stored in the memory.

6. The apparatus of claim 1, where the third logic is configured to control, as a function of the entropy, a blocklet matching process or an index lookup process.

* * * * *

UNITED STATES PATENT AND TRADEMARK OFFICE
CERTIFICATE OF CORRECTION

| | | |
|---|---|---|
| PATENT NO. | : 8,886,616 B2 | Page 1 of 1 |
| APPLICATION NO. | : 13/348209 | |
| DATED | : November 11, 2014 | |
| INVENTOR(S) | : Timothy Stoakes et al. | |

It is certified that error appears in the above-identified patent and that said Letters Patent is hereby corrected as shown below:

In the Specification,

In column 4, line 66, delete "value" and insert --values--.

Signed and Sealed this
Twenty-fourth Day of March, 2015

Michelle K. Lee
*Director of the United States Patent and Trademark Office*